US008635197B2

(12) United States Patent
Chaturvedi et al.

(10) Patent No.: US 8,635,197 B2
(45) Date of Patent: Jan. 21, 2014

(54) SYSTEMS AND METHODS FOR EFFICIENT DEVELOPMENT OF A RULE-BASED SYSTEM USING CROWD-SOURCING

(75) Inventors: Snigdha Chaturvedi, New Delhi (IN); Tanveer Afzal Faruquie, New Delhi (IN); L. Venkata Subramaniam, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 13/036,454

(22) Filed: Feb. 28, 2011

(65) Prior Publication Data
US 2012/0221508 A1 Aug. 30, 2012

(51) Int. Cl.
*G06F 17/00* (2006.01)
*G06F 17/30* (2006.01)

(52) U.S. Cl.
CPC ............... *G06F 17/00* (2013.01); *G06F 17/30* (2013.01)
USPC ........... 707/694; 707/602; 707/688; 707/749; 707/758

(58) Field of Classification Search
CPC ........................................................ G06F 17/30
USPC .......... 707/692–700, 602, 609, 688, 749, 758
See application file for complete search history.

(56) References Cited

U.S. PATENT DOCUMENTS

| | | | | |
|---|---|---|---|---|
| 6,477,510 B1 * | 11/2002 | Johnson | ............................ | 705/30 |
| 7,287,019 B2 * | 10/2007 | Kapoor et al. | .......................... | 1/1 |
| 8,250,078 B2 * | 8/2012 | Bayliss | .......................... | 707/749 |
| 2002/0152208 A1 * | 10/2002 | Bloedorn | ........................... | 707/6 |
| 2003/0028507 A1 * | 2/2003 | Pauliks et al. | ....................... | 707/1 |
| 2004/0002973 A1 * | 1/2004 | Chaudhuri et al. | ................ | 707/7 |
| 2004/0107386 A1 * | 6/2004 | Burdick et al. | ................... | 714/38 |
| 2004/0181526 A1 * | 9/2004 | Burdick et al. | ..................... | 707/6 |
| 2004/0221237 A1 * | 11/2004 | Foote et al. | ..................... | 715/700 |
| 2005/0182739 A1 * | 8/2005 | Dasu et al. | ....................... | 706/47 |
| 2006/0116995 A1 * | 6/2006 | Bloedorn | ........................... | 707/3 |
| 2006/0235771 A1 * | 10/2006 | Oberoi | ............................ | 705/29 |
| 2008/0077573 A1 * | 3/2008 | Weinberg et al. | ................. | 707/5 |
| 2009/0106245 A1 * | 4/2009 | Salcedo | ............................ | 707/6 |
| 2009/0198678 A1 * | 8/2009 | Conrad et al. | ..................... | 707/5 |

(Continued)

FOREIGN PATENT DOCUMENTS

EP 1589415 * 10/2005
WO WO 01/18672 * 3/2001

(Continued)

OTHER PUBLICATIONS

Eckerson, Wayne W., "Data Quality and the Bottom Line: Achieving Business Success through a Commitment to High Quality Data," The Data Warehousing Institute, 2002, 36 pages, Technical Bulletin.

(Continued)

*Primary Examiner* — Srirama Channavajjala
(74) *Attorney, Agent, or Firm* — Ference & Associates LLC

(57) ABSTRACT

Described herein are methods, systems, apparatuses and products for efficient development of a rule-based system. An aspect provides a method including accessing data records; converting said data records to an intermediate form; utilizing intermediate forms to compute similarity scores for said data records; and selecting as an example to be provided for rule making at least one record of said data records having a maximum dissimilarity score indicative of dissimilarity to already considered examples.

10 Claims, 12 Drawing Sheets

(56) References Cited

U.S. PATENT DOCUMENTS

| | | | |
|---|---|---|---|
| 2009/0210418 A1* | 8/2009 | Arasu et al. | 707/6 |
| 2009/0297032 A1* | 12/2009 | Loui et al. | 382/195 |
| 2010/0185691 A1 | 7/2010 | Irmak et al. | |

FOREIGN PATENT DOCUMENTS

| | | | |
|---|---|---|---|
| WO | WO 03/012685 | * | 2/2003 |
| WO | WO 2004/088464 | * | 10/2004 |
| WO | WO 2007/062156 | * | 5/2007 |
| WO | WO2008029150 A1 | | 3/2008 |

OTHER PUBLICATIONS

Redman, Thomas C., "Data: An Unfolding Quality Disaster," Information Management Magazine, Aug. 1, 2004, 7 pages. Can be found at http://www.information-management.com/issues/20040801/1007211-1.html as of Jun. 20, 2012.

English, Larry, "The High Costs of Low-Quality Data," Information Management Magazine, Jan. 1, 1998, 5 pages. Can be found at http://www.information-management.com/issues/19980101/771-1.html as of Jun. 20, 2012.

Price Waterhouse Coopers, "Global Data Management Survey 2001: The new economy is the data economy," Global Risk Management Solutions, 20 pages, Technical Bulletin, 2001.

Howe, Jeff, "The Rise of Crowdsourcing," Wired, Issue 14.06, 4 pages. Can be found at http://www.wired.com/archive/14.06crowds.html as of Jun. 20, 2012.

Chinchor, N. et al., "Evaluating Message Understanding Systems: An Analysis of the Third Message Understanding Conference (MUC-3)," Computational Linguistics, 1993, pp. 409-449, vol. 19, No. 3.

Hahn, U. et al., "Towards Text Knowledge Engineering," AAAI 98—Proceedings, American Association for Artificial Intelligence, 1998, pp. 524-531.

Hearst, M. A. et al., "Auomatc Acquisition of Hyponyms from Large Text Corpora," Proceedings of COLING-92, Nantes, Aug. 23-28, 1992, pp. 539-545.

\* cited by examiner

1: Input:
Set $U$ = The input patterns dataset
$N$ = Number of records desired in Set $L$
Output:
Set $L$
2: for all $u \in U$ do
3:     $c_u \leftarrow$ count of occurrence of $u$ in $U$
4: end for
5: $u_L \leftarrow \arg\max_u c_u$
6: $L = \{ u_L \}$
7: Delete $u_L$ from $U$
8: for $i = 2$ to $N$ do
9:     for all $u \in U$ do
10:        Compute $S(u,L)$
11:     end for
12:     $u_L \leftarrow \arg\min_u S(u,L)$
13:     Add $u_L$ to $L$
14:     Delete all occurrences of $u_L$ from $U$
15: end for

FIG. 1

Consider a dataset with 2 patterns

Pattern 1: A+B++T+C+

Pattern 2: +R++T+C

Extraction of features

| Patterns | Features extracted |
|---|---|
| A+B++T+C+ | A+B++, ++T+, +C+ |
| +R++T+C | +R++, ++T+, +C |

Representing patterns as a vector

| Patterns | A+B++ | ++T+ | +C+ | +R++ | +C |
|---|---|---|---|---|---|
| A+B++T+C+ | 1 | 1 | 1 | 0 | 0 |
| +R++T+C | 0 | 1 | 0 | 1 | 1 |

* Numbers in the cell indicate presence of that particular feature

FIG. 2

| Noisy Data | Clean Data | | | | | Unhandled Tokens |
|---|---|---|---|---|---|---|
| Address to be cleansed | House No. | Area | City | State | Zip Code | |
| 455, P5, Vasant Kunj, N Delhi, 110070 | 455 | Vasant Kunj | New Delhi | Delhi | 110070 | P5 |

FIG. 5

1: Input:
   Set $U$ = The input dataset consisting of the patterns and the corresponding unhandled part generated by the given rule based cleansing model
   $N$ = Number of records desired in Set $Z$
   Output:
   Set $L$
2: for all $u \in U$ do
3: $\quad f(u) \leftarrow$ frequency of the unhandled part of $u$ in $U$
4: end for
5: $u_L \leftarrow \arg\max_u f(u)$
6: $L = \{u_L\}$
7: Delete $u_L$ from $U$
8: for $i = 2$ to $N$ do
9: $\quad$ for all $u \in U$ do
10: $\quad\quad$ Compute $S(u, L)$
11: $\quad$ end for
12: $\quad$ Select the top $k$ patterns with least $S(u, L)$ value $\{u'_L\} \leftarrow \arg\min_u^k S(u, L)$ where $1 \leq i \leq k$)
13: $\quad u_L \leftarrow \arg\max_{u'_L} f(u'_L)$
14: $\quad$ Add $u_L$ to $L$
15: $\quad$ Delete all occurrences of $u_L$ from $U$
16: end for

FIG. 6

| Method Name | No. of Patterns Selected | Accuracy |
|---|---|---|
| Difficulty Method | 100 | 65.68% |
| SRD Report Based Method | 100 | 71.52% |

FIG. 11

SYSTEMS AND METHODS FOR EFFICIENT DEVELOPMENT OF A RULE-BASED SYSTEM USING CROWD-SOURCING

FIELD OF THE INVENTION

The subject matter presented herein generally relates to development of rule-based systems for data cleansing.

BACKGROUND

Enterprises today accumulate huge quantities of data that is often noisy and unstructured in nature, making data cleansing an important task. Data cleansing refers to standardizing data from different sources to a common format so that data can be better utilized. Most of the enterprise data cleansing models are rule-based and involve a lot of manual effort. Writing data quality rules is a tedious task and often results in creation of erroneous rules because of the ambiguities that the data presents. A robust data cleansing model should be capable of handling a wide variety of records, and often the model is dependant on the choice of the sample records knowledge engineers use to write the rules.

BRIEF SUMMARY

One aspect provides a computer program product comprising: a computer readable storage medium having computer readable program code embodied therewith, the computer readable program code comprising: computer readable program code configured to access data records; computer readable program code configured to convert said data records to an intermediate form; computer readable program code configured to utilize intermediate forms to compute similarity scores for said data records; and computer readable program code configured to select as an example to be provided for rule making at least one record of said data records having a maximum dissimilarity score indicative of dissimilarity to already considered examples.

Another aspect provides a method comprising: accessing data records; converting said data records to an intermediate form; utilizing intermediate forms to compute similarity scores for said data records; and selecting as an example to be provided for rule making at least one record of said data records having a maximum dissimilarity score indicative of dissimilarity to already considered examples.

A further aspect provides a system comprising: at least one processor; and a memory device operatively connected to the at least one processor; wherein, responsive to execution of program instructions accessible to the at least one processor, the at least one processor is configured to: access data records; convert said data records to an intermediate form; utilize intermediate forms to compute similarity scores for said data records; and select as an example to be provided for rule making at least one record of said data records having a maximum dissimilarity score indicative of dissimilarity to already considered examples.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 1 illustrates an example of selecting dissimilar example records.

FIG. 2 illustrates an example of feature extraction and pattern representation.

FIG. 5 illustrates an example of unhandled tokens.

FIG. 6 illustrates an example of selecting difficult example records.

FIG. 11 illustrates a comparison of accuracy for different methods of selecting example records.

DETAILED DESCRIPTION

Figure 3:
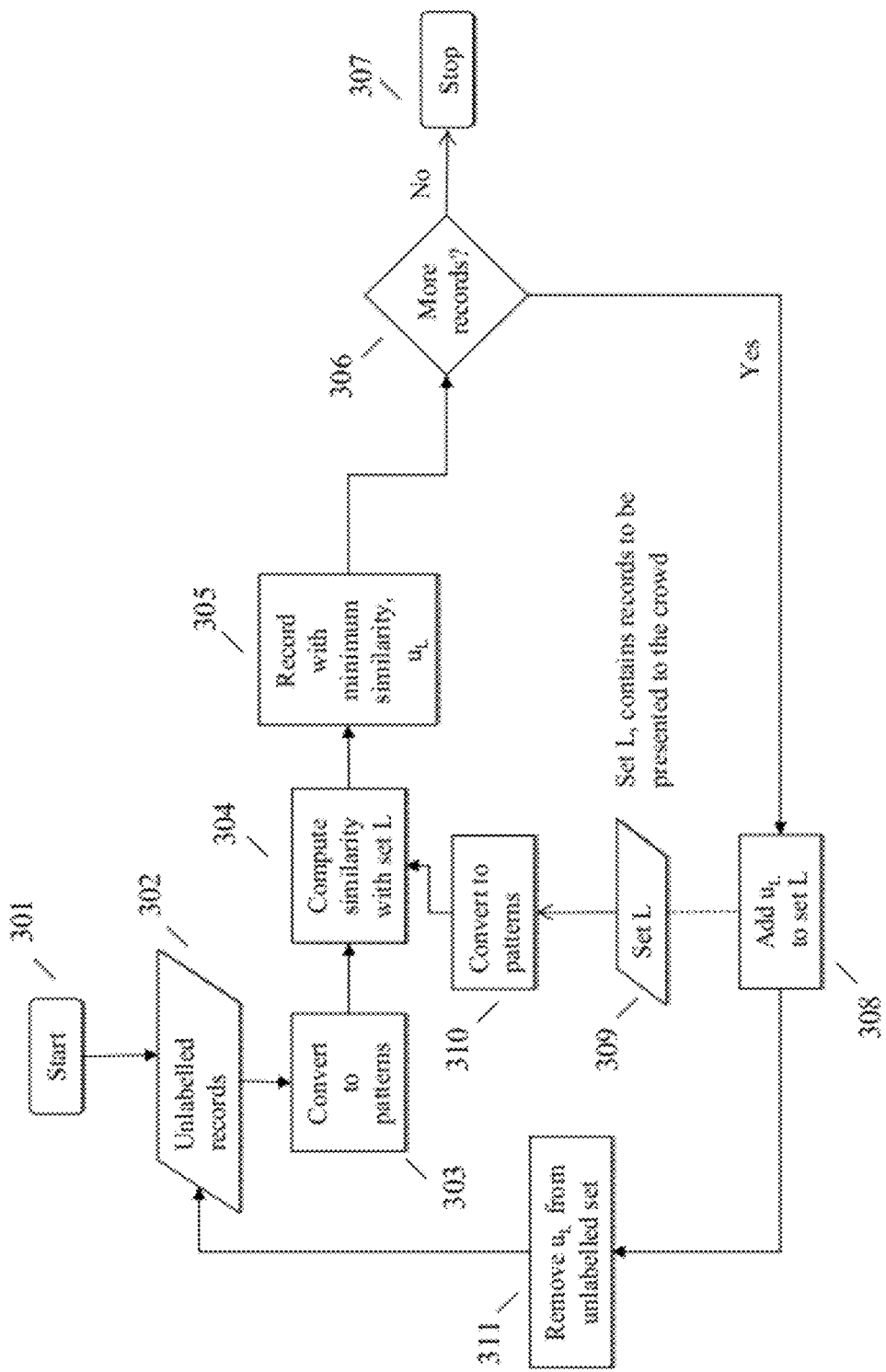
FIG. 3 illustrates an example for selecting dissimilar example records.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

With the growing data in enterprises, it is becoming increasingly difficult to effectively utilize data, as it is often stored in different sources in different formats. Unless the data from all the sources is standardized, it is difficult to identify the duplicate entities present within and across the data sources. This process of segmenting, standardizing, filling missing values, and removing duplicates from a data source is called data cleansing.

Without clean or cleansed data it becomes difficult to create accurate reports or to embrace a data warehousing or a master data management solution. It is also evident that most of the data warehousing or MDM solutions fail because of erroneous data. Hence, data cleansing becomes an important process in the enterprise to achieve its operational, strategic and competitive objectives. Lack of quality data results in customer churn, low customer satisfaction and missed opportunities to earn revenues. Studies reveal that poor data costs billions of dollars to US businesses and as much as 75% of companies experience profit erosion because of poor quality data.

As described herein, most data cleansing models try to segment, standardize and fill the missing values in the data. An example of such a cleansing model is a set of standardization rules for addresses where a given address record is split into various components like door, building name, street, area, city, zip code et cetera. Another example is standardizing product descriptions, where a given product description is split into different parts like brand name, quantity, color, description et cetera.

One of the main problems in achieving cleansing is to segment the given data into various components as described above for which a human expert, called a knowledge engineer, writes rules. In most of the cases it is possible that different people can segment the same record into different components because of the ambiguities that the data presents. An example of such a case can be given from Indian address segmentation, where an address record "2221 C-2 Vasant Kunj New Delhi" can be split into {Door: 2221, Block: C-2, Area: Vasant Kunj, City: New Delhi} and {Door: 2221 C-2, Area: Vasant Kunj, City: New Delhi}. To avoid such ambiguities that creep into the rule-based models that a human expert develops, it is beneficial to present the ground truth in the form of labeled data. Creating labeled data is a costly operation and is also error prone.

Accordingly, an embodiment provides a crowd sourcing based mechanism to label a diverse set of training examples chosen to write rules. Crowd sourcing is used as an example of leveraging the collective intelligence of the crowd to disambiguate the segmentation results that different people label.

Ideally, a robust model should be capable of handling a wide variety of records. However, in real life, performance of such models is heavily dependent on the choice of training data used for model creation. Unfortunately, cleansing records manually is a costly and time consuming affair employing domain experts, and hence only small subsets of data can be used for rule-writing. Furthermore, multiple records can lead to generation of the same rule, and hence care needs to be taken to manage the manual cleansing effort by choosing records that yield the most diverse rules. This saves the rule-writer's time and aids in writing more rules by looking at fewer but interesting examples that span the data space.

Some previous work for choosing appropriate training samples has been done for machine learning based cleansing models. However, rule-based models, in spite of being the ones used in practice, have received very little attention. Choosing a diverse set of samples from the given data set has a two-fold advantage in both labeling the data and for writing rules. To select a diverse set of examples, a method to identify similar records is important. Thus, an embodiment provides a method to represent the textual records, like addresses and product data, into patterns that are then used to compute the similarity of the records. Selecting a diverse set of examples, which when used to create rules, can cover most of the data space. Once these instances are selected, crowd sourcing may be used to label the data that is then given to the human expert to write rules.

Another important aspect to be considered while selecting a diverse set of examples is to make sure that the most difficult examples, which create ambiguity for human expert to write rules, are chosen. Embodiments provide a method for selecting the most diverse and difficult set of training examples so that the combined intelligence gained from crowd sourcing can be effectively utilized to address the labeling of a difficult set of examples. This also leads to a rule set that covers the maximum part of the data set.

Rule-Based Systems

A rule-based system is used to encode a human expert's knowledge into an automated system that provides intelligent decisions with justification. A rule-based system consists of three parts: 1) Rule base, 2) Inference Engine, and 3) Working Memory.

A rule base contains a set of rules encoded in the form of IF (condition) THEN (action). Where a condition is expressed logically as conjunctions (occasionally, disjunctions) of predicates. Action generally refers to the action to be taken if the condition is met. In the data-cleansing world, the action part is generally assigning a class label to a token or a set of tokens in a textual record. Working memory consists of a collection of records on which a rule-based system has to be applied. An inference engine matches the given set of rules against a working memory and decides which actions are to be taken on which records, depending on the matches it gets.

Development and maintenance of rule-based system constitutes knowledge engineering. A person who does this task is often called a knowledge engineer. Main tasks of a knowledge engineer include deciding the knowledge representations and providing for rule base creation. A good rule set should have the following characteristics.

Mutually Exclusive Rules: The rules in the rule set are mutually exclusive if no two sets of rules are triggered by the same record. This property ensures that each and every record is covered by one set of rules.

Exhaustive Rules: A rule set is exhaustive if it has rules to cover all the records, meaning each record has a set of rules that can process it completely. In practice a knowledge engineer ensures the first property by creating an ordered set of rules. The second property depends on the set of examples that the knowledge engineer chooses to write rules for. Suppose a rule writer has written M rules looking at some sample data records, then the coverage of the rule set is given by the percentage of the total number of records that can be handled by the rule set. One of the main objectives of the knowledge engineer is to maximize the coverage of the rule set for a given dataset. Accordingly, embodiments identify a set of diverse records which, when used to write rules, give the maximum coverage.

Data Cleansing Using Rule-Based Systems

Data cleansing refers to segmenting, standardizing, filling in missing values, and removing duplicates from noisy data. Most enterprise data cleansing systems employ rule-based systems. Main tasks involved in building a rule-based system for data cleansing include deciding the knowledge representation and creating the rule base to perform the actual cleansing task.

Most of the rule-based data cleansing systems designed to handle unstructured textual records operate by converting individual records to a more convenient intermediate representation instead of directly processing the tokens (words) in the record. A predefined but flexible alphabet set is used to convert the text data to the intermediate representation. This pre-processing is important as it ensures an easier generalization of the handcrafted rules. Herein, intermediate representations are referred to as patterns.

Consider for example a record that represents a postal address "127 Mahima Towers Mahatma Gandhi Road Calcutta". This representation is converted to the following pattern: ^+B++SC. Here, + represents an unknown word, ^ represents a numeric token and B, S and C are special tokens that appear in domain dictionaries and encode known knowledge about the concerned domain. Specifically B, S and C encode Building Type, Street Type and City Name, respectively.

Similarly, consider a textual product description: "GILLETTE SERIES CL 4.2 OZ $10 SCENTED DEO AQUA ODOUR". In this case, the input record gets converted to B++^ UU^+T++. Here, + represents an unknown word, ^ represents a numeric token and B, U and T are words that appear in domain dictionaries. After conversion to the pattern form, the rule writer enriches the rule-based system by manually crafting rules. These rules perform the desired task by incorporating domain knowledge into the system.

As above, the rules generally are of the following format: IF (condition) THEN (action). The condition part of the rule is composed of a substring of the patterns present in the dataset. These substrings are referred to herein as sub-patterns. For instance, in the above example from the product description domain, suppose a rule needs to be written to extract the price of the product from the product description, but in some other currency (say Euro). For such a rule, U^ (representing $10) would form the "condition" part and the "action" part would be multiplication of the amount ($10) by appropriate factor (exploiting domain knowledge) and storing the result in a separate column.

A human expert writes rules for the patterns to handle the entire record. So the choice of the records and the corresponding patterns chosen for writing rules becomes an important aspect for creating rule sets. This greatly influences the effective utilization of the knowledge engineer services. So choosing an optimal set of diverse records saves lot of time and cost associated with the knowledge engineer services.

Crowd Sourcing

Crowd sourcing is a distributed problem-solving model where a problem is broadcast to a set of people that come up with a solution. There are various ways crowd sourcing can be used to develop solutions for problems. A use of crowd sourcing is to use collective wisdom of group of people to solve tough and ambiguous problems. Crowd sourcing is used as a non-limiting example for a mechanism of labeling herein. An embodiment exploits crowd sourcing to disambiguate the segmentation ambiguities that arise while labeling training samples for creating rule-based systems.

Crowd sourcing can help in solving this problem very quickly, often at a reduced cost, as it can use amateurs or part-timers working in their spare time to solve the problem. In an example embodiment, crowd sourcing is used for labeling sample data that can assist a knowledge engineer in writing error free rules. For example, a diverse set of difficult textual records is given to a set of people, and each record is given to a subset of people participating in the labeling exercise. Collective intelligence of the crowd is then used to arrive at the correct segmentation for the chosen set of records that are then used for writing data cleansing rules. Once different sets of labels for a given record are obtained, the correct segmentation used can be for example the one which most of the people have arrived at. Hence, effective utilization of the crowd becomes an aspect in the choice of training data selection.

The description now turns to the figures. The illustrated example embodiments will be best understood by reference to the figures. The following description is intended only by way of example and simply illustrates certain example embodiments representative of the invention, as claimed.

Optimal Training Data Selection

Knowledge engineers choose to construct rules for processing patterns and not the textual records since this assists easier generalization. So, knowledge engineers convert text records to the corresponding pattern form. Embodiments focus on selection of optimum training examples for creation/customization of a cleansing model. In this context, it is intuitive that a method for selection of training examples should be aligned with the process of how the rules are written. Since the rules are constructed for processing patterns (and not individual text records), embodiments also convert the textual dataset into pattern form.

Creating a Rule-Based Cleansing Model

Embodiments provide methods for creating a rule-based cleansing model from scratch. In the first step, a minimal set of distinct examples (in pattern format) is selected from the pattern dataset. Next, a textual record corresponding to each of the chosen patterns is randomly chosen. These are presented (for example, to the crowd) for labeling. Embodiments then provide the labels, as well as the corresponding example records, to the knowledge engineer for rule writing. Some of the notation used herein is now defined:

U: Set of all the patterns corresponding to the given data set.

L: Set of selected patterns for writing the rule set.

N: Size of set L.

$S(u,L)$: Similarity of a pattern u with set L.

FIG. 1 gives a specific example of a process for selecting dissimilar example records (referred to herein as a dissimilarity method). The desired size of set L, N, depends on the availability of several resources, such as the size of the crowd, number of knowledge engineers available, and the time allotted for the rule set creation task. The process takes N, along with the input pattern dataset U, as input (Line 1).

The process works by iteratively choosing a pattern from U that is most dissimilar to the patterns already present in L. The first step, hence, is to initialize L. An intuitive method of the initialization would be to populate L with the most frequent pattern of U (Lines 2-6). Moreover, for an efficient utilization of the crowd's and the knowledge engineer's efforts, one would want to avoid occurrences of repetitions in L. Therefore, in the initialization step (and also in later steps), a pattern is deleted from set U once it gets selected for inclusion in L (Line 7). Then general procedure for the selection of the remaining N−1 patterns (Lines 8-15) proceeds in the following steps.

For every pattern in U, compute the similarity of the pattern with set L (Lines 9-10). Select the record, $u_L$, of U that has the least similarity with set L, $S(u,L)$, and add it to set L (Line12-13). Delete the selected record $u_L$ from U. These steps are performed iteratively until the size of L grows to N.

Computing Similarity of a Pattern u with Set L ($S(u,L)$)

The problem of computing similarity of a pattern with already selected patterns (Set L) is now addressed. An embodiment utilizes a feature extraction method for each of the concerned patterns that is closely tied with the mode of operation of the rule-based cleansing model. Then, an embodiment computes a similarity between the pattern u with each of the members of set L using a weighted similarity measure especially designed for this domain.

Feature Extraction

An embodiment extracts a set of characterizing features for each pattern under consideration. Since features form the basis for computing similarity, they themselves should encode the usefulness of the pattern for a knowledge engineer.

Words (of a textual record) present in the training dictionary represent a well-known entity within the record and the symbols (of patterns) corresponding to those words are called markers. The remaining symbols of the alphabet set are termed as nonmarkers.

Since markers help in identifying a known entity within a record, they play an important role in writing rules for that particular and other related entities. For example, consider a postal address record: "45, Zenith Towers, Bose Road, Calcutta". This record gets converted to the following pattern: ^+B+SC. Here B, S and C are markers representing Building Type, Street Type and City Name, respectively; and ^ and + are non-markers. In this example, the knowledge engineer might write a rule as: IF (+S) THEN (+ is Street Name and S is Street Type). To incorporate this information, an embodiment adopts a flexible sized overlapping window-based approach for feature extraction. In this, a given pattern is scanned from one end to the other, and each marker with all neighboring non-markers forms an independent feature. For example, the features extracted for pattern ^+B++T+C+ will be ^+B++, ++T+, and +C+, as illustrated in FIG. 2.

Referring to FIG. 2, an embodiment converts a given pattern as an n-dimensional vector of binary features. The n-dimensional feature set comprises of the features (n in number) extracted for all the patterns under consideration and a particular feature's value represents presence or absence of that feature. FIG. 2 shows the complete procedure for extracting features for an example dataset of 2 records.

For computing similarity of a pattern u with L, an embodiment utilizes a method to compute similarity between two patterns u and v, as follows.

Computing Similarity Between Two Patterns

Similarity between feature vector representations of any two patterns u and v has contributions from two components. First, cosine similarity between feature vector representations of u and v incorporates the similarity between two patterns due to presence of common features. Second, similarity in lengths (number of symbols) of u and v also contributes. An embodiment utilizes a separate factor addressing this issue because the length of the feature varies from one feature to another. So, there is some mechanism that takes into consideration the number of symbols present in each of the two patterns.

Therefore, the similarity, S(u, v), between two patterns may be defined as:

$$S(u,v) = \frac{\sum_{i=1}^{i=k} w(f_i) \cdot f_i(u) \cdot f_i(v)}{\sqrt{\sum_{i=1}^{i=k} w(f_i) \cdot f_i^2(u)} \sqrt{\sum_{i=1}^{i=k} w(f_i) \cdot f_i^2(v)}} \cdot e^{-\frac{|N_u - N_v|}{N_u + N_v}}$$

where, $k$ = Size of feature set $w(f)$ = Weight of feature, $f$, $N_u$ = Length of record $u$, and $N_v$ = Length of record, $v$.

The weight of a feature is, in turn, dependent on two other factors: (1) the information contained in the feature, I(f); and (2) length of the feature, L(f). The weight of a feature is defined as:

$w(f) = I(f) \cdot L(f)$

Information Content

Earlier work in this area suggests that rarity is more important than commonality. In the domain described herein, some features are more important than others are. In other words, some features carry more information than others do. The amount of information carried by a feature depends on the probability of occurrence of that feature in the dataset and can be defined as:

$I(f) = -\log(P_f)$ where $P_f$=Probability of occurrence of the feature f.

The probability associated with a feature can be approximated by its frequency of occurrence in the dataset.

Length

Length of a feature also holds an important position in deciding the feature's importance. If two patterns have a longer feature in common than a pair that has smaller length feature in common, then intuitively the members of the former pair are more similar than the members of the latter pair.

This is incorporated into a method by defining the length of a feature as:

$L(f) = 1 - \Theta_1 \cdot e^{(-l \cdot \Theta_2)}$ where, l=Number of symbols in the feature, $\Theta_1$ and $\Theta_2$=Parameters of the system.

Figure 4:
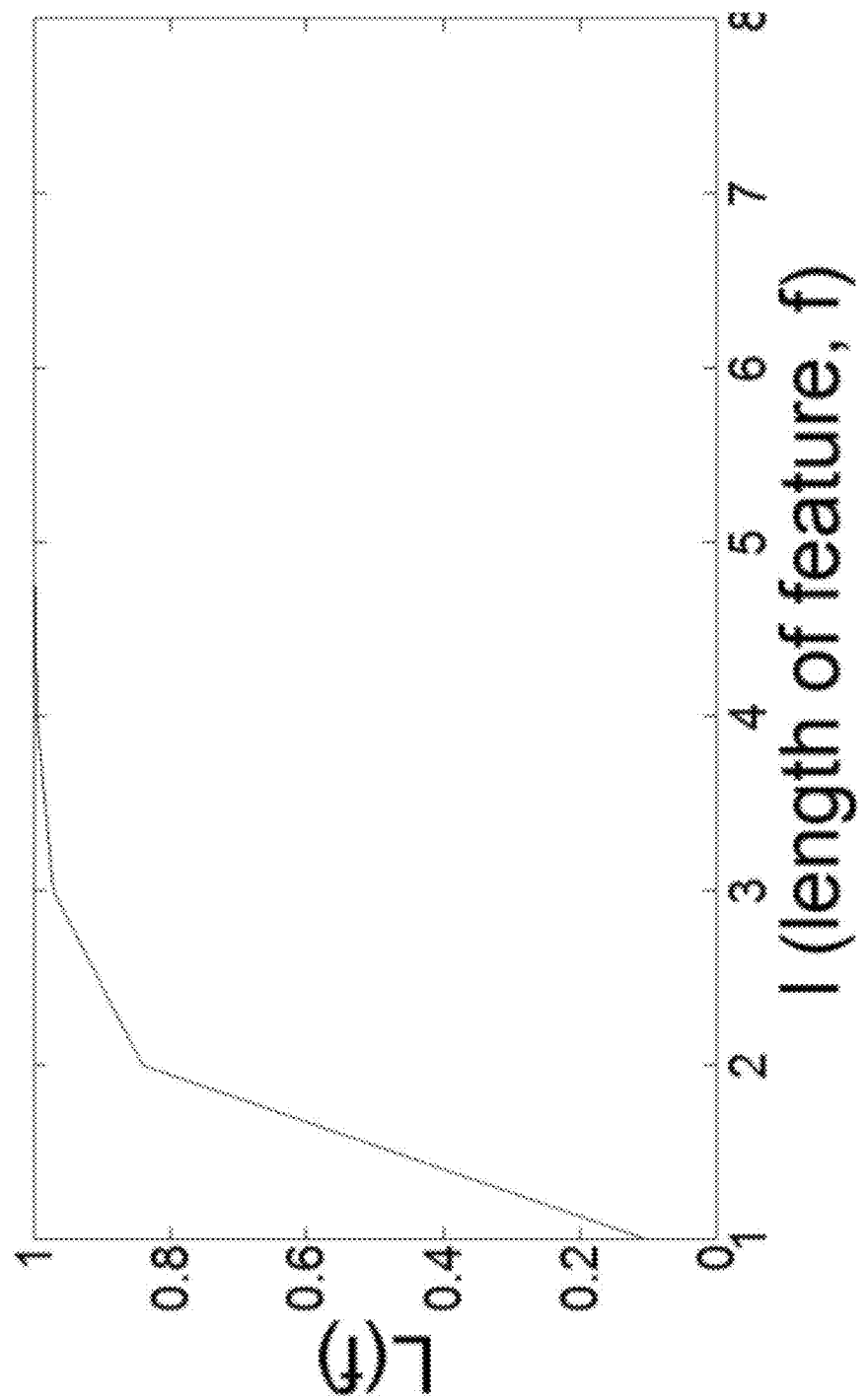
FIG. 4 illustrates the relation of feature length v. feature importance.

This definition ensures a non-linear increase in L(f) with an increase in the length of the feature. Domain experts (usually) decide the (threshold, also referred to herein as "T") values of $\Theta_1$ and $\Theta_2$. For example, in example evaluations with postal address data (described further herein), values of $\Theta_1$=5.0 and $\Theta_2$=1.72 were chosen. FIG. 4 shows the variation of L(f) with length of patterns as a result of the chosen parameters values.

Computing Similarity of a Pattern with Set L

Having defined the similarity measure to compute similarity between two patterns, an embodiment can estimate the similarity of a pattern, u, with set L (S(u,L)) by average similarity of u with each of the members of L.

However, it turns out that as the size of L increases, the number of members of L which do not contribute significantly to S(u,L) increases exponentially. This happens because only a small fraction of total members of L are significantly similar to u. The remaining have a similarity value of almost 0. Therefore, an embodiment sets a threshold, $\Theta$, on the similarity of u with a particular member for deciding whether that similarity should be considered in calculation of S(u,L). S(u,L) is computed as:

$$S(u, L) = \frac{\sum_{v \in L, S(u,v) \geq \theta} S(u, v)}{N} \text{ where}$$

$N$ = Total number of patterns which have $S(u, v) \geq \Theta$, and $\Theta$ = Threshold on the similarity value.

Labeling the Selected Patterns and Utilizing them for Rule Writing

Embodiments may follow the above-described procedure to choose a distinct set of patterns from the unlabeled pattern dataset. Embodiments may then randomly choose an example record for each of the patterns in L and present them to the crowd for labeling. Methods such as those described herein can be used for obtaining the correct labeled form of a particular record. Finally, these labeled records as well as their corresponding patterns can be utilized by the knowledge engineers for rule writing.

An example dissimilarity method is illustrated generally in FIG. 3. At the start 301, an embodiment converts the input (unlabeled) records 302 to a pattern form 303 to provide the intermediate representation (pattern form). An embodiment calculates a similarity score for a pattern with set L. As a specific and non-limiting example, given a set of records (U) containing all unlabelled records, a sub-set (L), which is initially empty and may be initialized as described above, is selected to contain the records to be presented. If (N) records are to be retrieved, an embodiment performs the following.

For every record u of the set U, get S(u,L)=average similarity of u with L. Then, select a record u from L ($u_L$) at 305 that has the minimum similarity, that is: $u_L$=u with minimum S(u,L). If there is more than one option for $u_L$, one of the options may be chosen randomly, as no advantage is gained or lost in terms of dissimilarity from choosing among different $u_L$ options. If there are no more records at 306, the process may stop.

If there are more records, next an embodiment adds $u_L$ to L 308. Set L is then populated with $u_L$ 309 and, once the record $u_L$ is converted to a pattern 310, can be used in the similarity computation iteratively (at 304). Then, an embodiment removes all records having the same pattern as that of $u_L$ from U at 311.

Modifying an Existing Rule-Based Cleansing Model

An embodiment provides a method (referred to herein as a difficulty method) for selecting training instances for updating an existing rule set. In this case, it is assumed that a basic rule set is already present with the knowledge engineer and he or she has to customize it for a given dataset. Whenever a rule-based system is to be used for a new customer, a few modifications in the system are usually desirable. Even though a general rule-based model may yield a fair performance on the new dataset, addition/modification of a few data-specific rules can boost the performance by a huge margin. These changes are typically designed to handle the idiosyncrasies of the data. As mentioned herein, like creation, modification of a rule-based system is also a time consuming and costly task. The process involves identifying the "difficult" or characteristic records, labeling them, and providing them to the rule writer for modifying the rule set. Therefore, it is desirable to have an efficient method for "difficult" example selection.

Measuring Difficulty

Difficult examples are the ones that don't get segmented by the existing data cleansing models correctly. Unfortunately, in absence of labeled records, determining which examples get incorrectly segmented can be difficult.

However, from experience with rule-based models, it has been discovered that often practical applications of even the best performing systems fail to classify one or more tokens (words) of the text records. This happens because records of real world data contain a lot of noise and often these noisy parts don't satisfy the "condition" part of any of the rules and hence they don't get handled at all. Such tokens are referred to herein as the "unhandled tokens". An embodiment uses the presence of unhandled tokens as an indication of difficulty. FIG. 5 presents an example of an unhandled token.

Selecting Difficult Examples

FIG. 6 illustrates a specific example method for selection of difficult examples. The process can be used to write new rules/modify existing ones to customize an existing rule-based cleansing model. The method aims at suggesting patterns (Set L) that can be labeled and subsequently used for modification of the model. In the example method, set U is the input dataset containing the patterns and the corresponding unhandled part of the pattern. N, the desired size of L, is also decided by the user depending on the availability of resources and is provided as input (Line1).

Referring generally to FIG. 6, an embodiment begins with a step (Line 2-7) that chooses the pattern whose corresponding unhandled part is the most frequent one for the given dataset. Like the previous method (illustrated in FIG. 1), once an embodiment selects a pattern for inclusion into set L, it decides to remove it from set U in order to avoid repetitions in L.

Then, the following procedure for selecting the remaining N−1 patterns is adopted (Lines 8-16). For every pattern in U, the similarity of the pattern with set L (Lines 9-11) is computed. The method adopted for computation of S(u,L) is the same as that in the previously described method (FIG. 1). Then the top k patterns which are most dissimilar to L (Line 12) is selected. In the process $min^i$ stands for the $i^{th}$ minimum. Amongst these k patterns, the one whose unhandled part is the one with maximum frequency for inclusion into set L (Lines 13-14) is selected. Then, the selected record from U (Line 15) is deleted.

Figure 7:
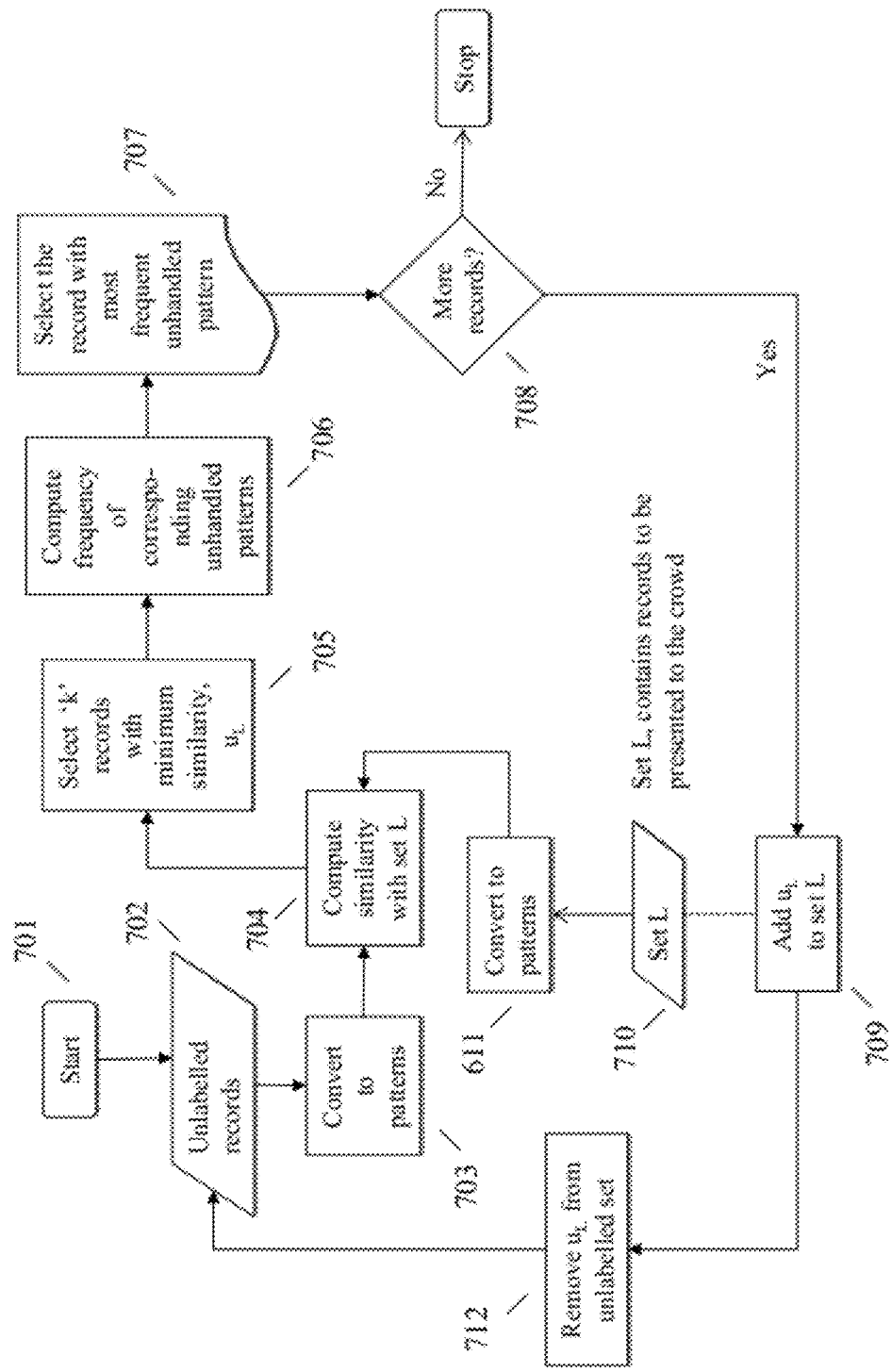
FIG. 7 illustrates an example of selecting difficult example records.

FIG. 7 generally describes a method for selecting difficult examples. In FIG. 7, many of the steps are similar to those in FIG. 3; thus, the differences will be highlighted here. A conventional method for selecting difficult examples (SRD report based) provides that for N "difficult" instances, identify N most frequently unhandled patterns and randomly choose 1 instance for each pattern. An embodiment provides a refinement wherein dissimilar records are used to populate the pool from which unhandled records are selected as difficult examples.

Thus, in step 705, records are selected having minimum similarity with an example record $u_L$. The frequency of corresponding unhandled patterns are then computed at 706. An embodiment selects as a "difficult" example a record with the most frequently unhandled pattern at 707. As above, the remainder of the process is similar to that of FIG. 3.

Labeling the Selected Patterns and Utilizing them for Rule Writing

As described herein, members of set L can be presented to the crowd for labeling. Subsequently, the labeled form, after disambiguation, along with the unlabeled form can be presented to the knowledge engineer for modification of the rule set.

Figure 8:
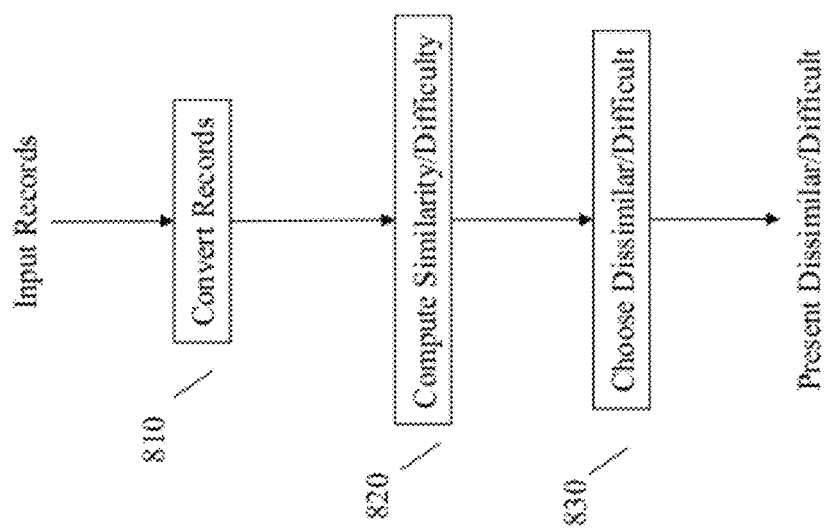
FIG. 8 illustrates a general method for selecting dissimilar and/or difficult example records.

Accordingly, referring to FIG. 8 as a non-limiting and general overview, an embodiment provides a method for selecting appropriate examples for building a rule-based system for data cleansing. As described herein, embodiments provide a method for measuring similarity between records, and/or the relative difficulty of records, and using this similarity/difficulty measure to choose an example set whose elements are as dissimilar from each other as possible and/or are as difficult as possible. This helps to ensure that the rule writer sees novelty in each of the chosen examples that will eventually lead to writing of more rules with fewer labeled examples. This also saves the time and effort spent in evaluating the relevance of each record as compared to randomly choosing examples.

Thus, in general terms, in a first step 810, an embodiment converts all the records by an intermediate representation form. In a second step 820, an embodiment computes a similarity and/or difficulty measure for each unlabelled record (as compared with the records that have already been presented to the crowd for labeling). In a third step 830, an embodiment selects the most dissimilar and/or difficult record for presentation.

As non-limiting examples, some example evaluation results are presented herein. These illustrate certain aspects of various embodiments, as described herein.

Two example processes, illustrated and described generally in connection with FIGS. 1-2 and FIGS. 5-6, respectively, for creation and modification of a rule-based cleansing model are described herein. These example processes outperform existing, standard procedures currently in practice.

Creating a Rule-Based Cleansing Model

Herein is evaluated a first process, termed dissimilarity method, which mines important patterns from a given dataset and suggests them to the knowledge engineer for rule writing.

Dataset

A dataset consisting of about 4750 Indian postal addresses that were present in plain text form was chosen. The records of the dataset were converted to the corresponding pattern form to get the patterns dataset. In this process the training dictionaries provided by the knowledge engineers for this domain were used.

Set Up

One hundred (100) (value of N) patterns were retrieved from the dataset of 4750 patterns (Set U). In the formula for L(f), the domain experts suggested use of 5.0 and 1.7 as values of $\Theta_1$ and $\Theta_2$, respectively. Also, the value of the other parameter in the model ($\Theta$ in the formula for S(u,L)) was chosen to be 0.3.

Random Selection Based Method

The performance of the method was compared with that of a current mode of operation, where a random sample of the given dataset is treated as the training set which is labeled and used for rule writing. For a fair comparison, 100 patterns were randomly selected from the patterns dataset and the performance of the dissimilarity method was compared therewith.

Evaluation

Both the conventional and dissimilarity methods were compared by counting the number of rules that the knowledge engineer writes when presented with the 100 chosen patterns. A method that leads to creation of more rules is judged to be the better one. Also considered was the time taken for writing a fixed number of rules (as an additional evaluation criterion).

Results

It was found that when presented with 100 patterns each, the knowledge engineer could write a total of 102 and 82 rules using the dissimilarity method and the random selection based (conventional) method, respectively. This indicates that the dissimilarity method performs better than the random sampling based method, which is currently in practice by the knowledge engineers.

Figure 9:
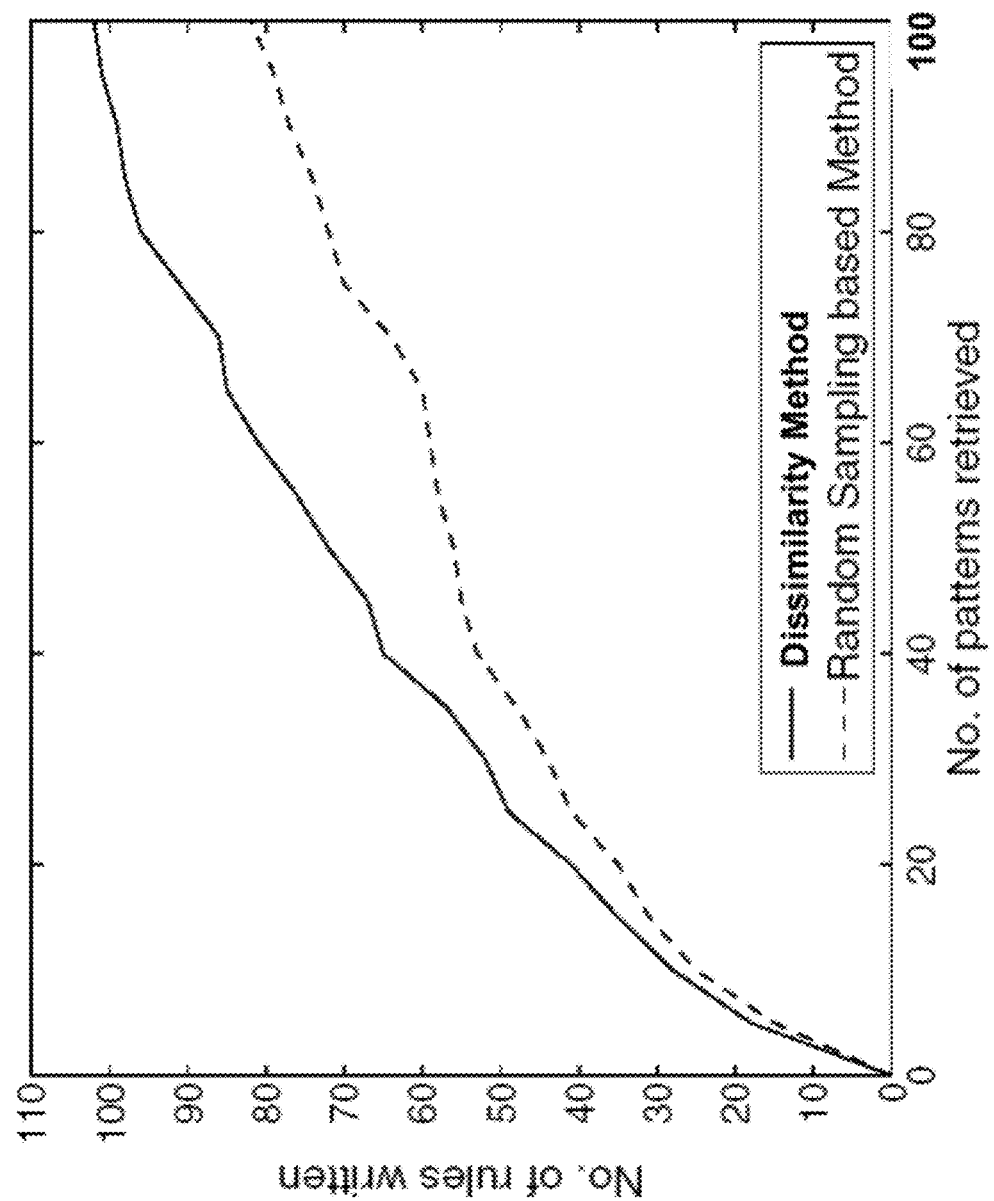
FIG. 9 illustrates a comparison of different methods for selecting example records.

Also, for both the methods, a graph was plotted to monitor the increase in number of rules that are written with increase in the number of patterns presented to the knowledge engineer. FIG. 9 shows the performance of both the methods. From the figure it can be observed that throughout the process of presentation of patterns to the knowledge engineer, the dissimilarity method outperforms the random selection based (conventional) method.

Figure 10:
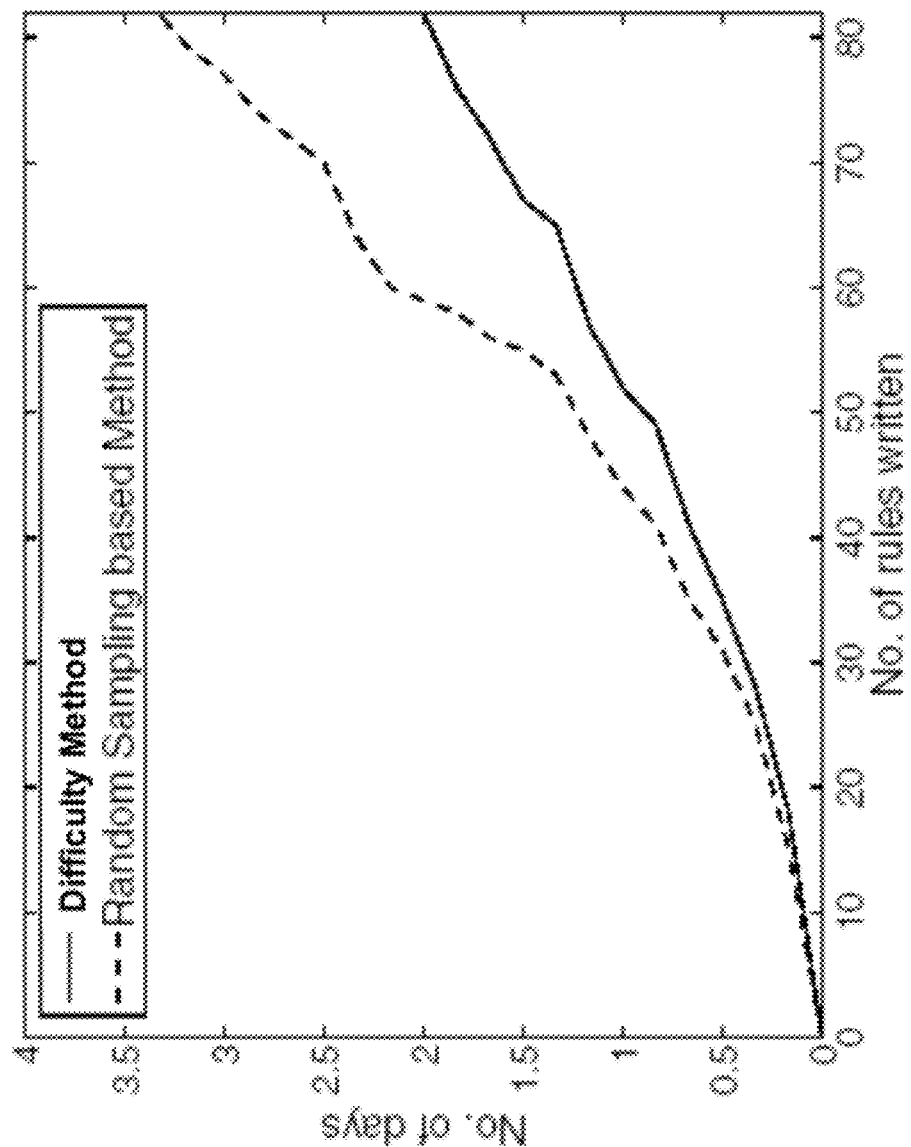
FIG. 10 illustrates a comparison of different methods for selecting example records.

Additionally, compared were the times taken for the rule writing task according to each method. A record of the approximate number of days knowledge engineers took to write a total of 82 rules using both the methods was kept. As illustrated, in FIG. 10, it was found that the knowledge engineers took about 40% less time for writing rules when presented with patterns mined using a dissimilarity method as compared to the time consumed for writing rules when patterns were chosen using the random sampling based (conventional) method. FIG. 10 shows the variation of time taken with the number of rules constructed. The solid curve marks the performance of the dissimilarity method while the performance of random sampling based (conventional) method is marked in dashed curve. It can be observed that the plot for the dissimilarity method consistently remains below the plot for random sampling based (conventional) method, which means that the dissimilarity method leads to a quicker rule-base development.

Modifying and Existing Rule-Based Cleansing Model

The performance of a second example process, termed the difficulty method, which was used to suggest distinct and difficult patterns to the knowledge engineer for modification of an existing rule-based cleansing model, was evaluated.

Existing Rule-Based Model

In this evaluation, the model was trained to identify various structural entities present in the records such as door number, area name, city name, zip code et cetera.

Dataset and Set Up

The same dataset and set up were used as in the previous evaluation.

Unhandled Report Based Method

The conventional method of operation for improving a rule-based model exploits a report of the dataset produced by the chosen rule-based model. The report is known as the "Unhandled Report". It lists all the subpatterns (substring of pattern) which were left unhandled by the classifier, their frequencies in the given dataset and the corresponding patterns in which these unhandled subpatterns appear as substrings. The knowledge engineer uses the unhandled report for improving the model by identifying the N most frequent unhandled subpatterns and randomly choosing one pattern, p, for each unhandled subpattern, u. The chosen pattern, p, is the one in which contains u as a substring. It should be noted that a particular unhandled subpattern, u, may appear in more than one pattern. Hence, there is a need to choose a pattern p. For example, an unhandled pattern, say +T+, appears in ^++B+T+C as well as in ^ R++B+T+C+.

Hence, this approach is one where the knowledge engineer maximizes the improvement achieved, in a given time, by constructing rules for the most frequently occurring unhandled subpatterns. In the evaluation, the performance of the difficulty method (providing difficult examples) was compared with the performance of the unhandled (SRD) report based method. For a fair comparison, 100 patterns were selected using the unhandled report based method.

Evaluation

First, an address was randomly selected corresponding to each of the N chosen patterns. The selected addresses were manually segmented by human experts. Also used was the rule-based model under consideration to segment the selected addresses. Then the accuracy of the rule-based-model was computed by comparing its segmentations to the manually generated segmentation.

Accuracy was computed as:

$$\text{Accuracy} = \frac{No. \text{ of correctly labeled tokens}}{\text{Total } No. \text{ of Tokens}}$$

For judging the effectiveness of the difficulty method, if the 100 patterns mined using the difficulty method belong to addresses on which accuracy of the existing rule-based model is low, then it means that the chosen patterns are the ones which are indeed difficult for the current model to segment. And hence, the difficulty method is successful in mining more 'difficult' patterns.

Results

FIG. 11 shows the performance of the difficulty method as compared to the performance of the 'Unhandled Report' based method. From the table it can be observed that the difficulty method outperforms the unhandled report based method. The existing rule-based segmentation model has a lower accuracy on the 100 patterns chosen by the proposed method. In other words, these 100 patterns are more difficult for the existing rule-based model than the 100 patterns chosen by the 'Unhandled Report' based method.

Figure 12:
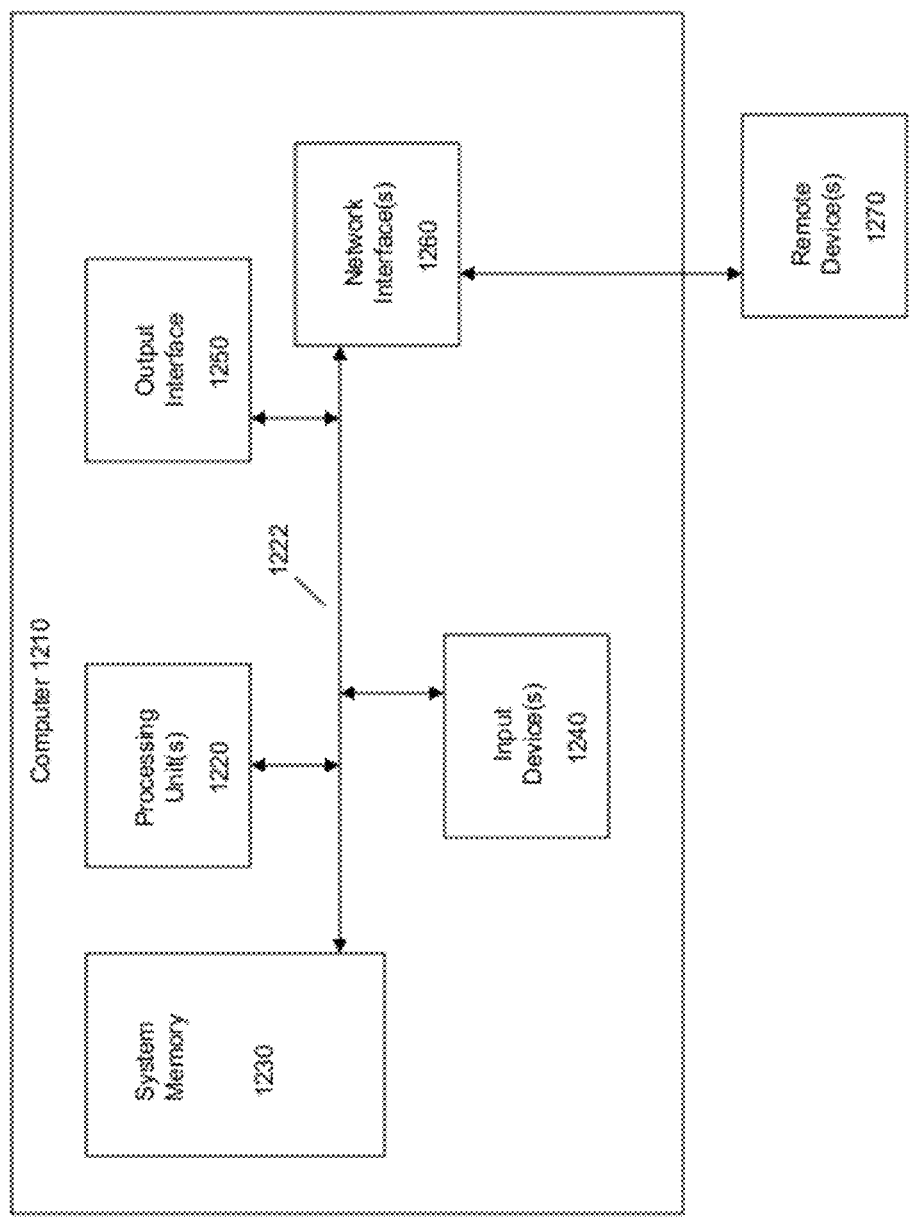
FIG. 12 illustrates an example computer system.

Referring to FIG. 12, it will be readily understood that certain embodiments can be implemented using any of a wide variety of devices or combinations of devices. An example device that may be used in implementing embodiments includes a computing device in the form of a computer 1210. In this regard, the computer 1210 may execute program instructions configured to provide for efficient selection of example records, and perform other functionality of the embodiments, as described herein.

Components of computer 1210 may include, but are not limited to, at least one processing unit 1220, a system memory 1230, and a system bus 1222 that couples various system components including the system memory 1230 to the processing unit(s) 1220. The computer 1210 may include or have access to a variety of computer readable media. The system memory 1230 may include computer readable storage media in the form of volatile and/or nonvolatile memory such as read only memory (ROM) and/or random access memory (RAM). By way of example, and not limitation, system memory 1230 may also include an operating system, application programs, other program modules, and program data.

A user can interface with (for example, enter commands and information) the computer 1210 through input devices 1240. A monitor or other type of device can also be connected to the system bus 1222 via an interface, such as an output interface 1250. In addition to a monitor, computers may also include other peripheral output devices. The computer 1210 may operate in a networked or distributed environment using logical connections (network interface 1260) to other remote computers or databases (remote device(s) 1270). The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in computer readable medium(s) having computer readable program code embodied therewith.

Any combination of computer readable medium(s) may be utilized. The computer readable medium may be a non-signal computer readable medium, referred to herein as a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any programming language or combinations thereof, including an object oriented programming language such as Java™, Smalltalk, C++ or the like and conventional procedural programming languages, such as the "C" programming language similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects have been described herein with reference to flowchart illustrations and/or block diagrams of methods, apparatuses, systems and computer program products according to example embodiments. It will be understood that the blocks of the flowchart illustrations and/or block diagrams, and combinations of blocks in the flowchart illustrations and/or block diagrams, can be implemented by computer program instructions. These computer program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer, or other programmable apparatus, provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A computer program product for data cleansing, said computer program product comprising:
a computer readable storage medium having computer readable program code embodied therewith, the computer readable program code comprising:
computer readable program code configured to access data records;
computer readable program code configured to convert said data records to an intermediate form;
computer readable program code configured to utilize intermediate forms of said data records to compute similarity scores of individual ones of said data records with respect to one another;
computer readable program code configured to provide, from among said data records, at least one example record for rule making; and
computer readable program code configured to thereafter select from among said data records at least one additional example record for rule making;
the additional example record comprising at least one record presenting at least one similarity score which indicates a least similarity with respect to the at least one example record already provided;
the at least one example record and the at least one additional example record comprising a rule set;
computer readable program code configured to employ a difficulty method to select from among said data records at least one training instance for updating the rule set; and
the selected at least one training instance comprising at least one example record presenting at least one similarity score which indicates a least similarity with respect to at least one example record in the rule set.

2. The computer program product according to claim 1, wherein the intermediate form is a pattern form of a text record.

3. The computer program product according to claim 1, wherein to employ a difficulty method comprises computing a difficulty measure based on at least one unhandled token from the selected at least one training instance.

4. The computer program product according to claim 1, wherein said data records were labeled via a crowd-sourcing mechanism.

5. The computer program product according to claim 1, wherein the data records comprise at least one of postal records, sales records, and transaction records.

6. A system for data cleansing, said system comprising:
at least one processor; and
a memory device operatively connected to the at least one processor;
wherein, responsive to execution of program instructions accessible to the at least one processor, the at least one processor is configured to:
access data records;
convert said data records to an intermediate form;
utilize intermediate forms of said data records to compute similarity scores of individual ones of said data records with respect to one another;
provide, from among said data records, at least one example record for rule making; and
thereafter select from among said data records at least one additional example record for rule making;
the additional example record comprising at least one record presenting at least one similarity score which indicates a least similarity with respect to the at least one example record already provided;
wherein the at least one example record and the at least one additional example record comprising a rule set and, responsive to execution of the program instructions, the at least one processor is further configured to:
employ a difficulty method to select from among said data records at least one training instance for updating the rule set;
the selected at least one training instance comprising at least one example record presenting at least one similarity score which indicates a least similarity with respect to at least one example record in the rule set.

7. The system according to claim 6, wherein the intermediate form is a pattern form of a text record.

8. The system according to claim 7, wherein to employ a difficulty method comprises computing a difficulty measure based on at least one unhandled token from the selected at least one training instance.

9. The system according to claim 6, wherein said data records were labeled via a crowd-sourcing mechanism.

10. The system according to claim 6, wherein the data records comprise at least one of postal records, sales records, and transaction records.

* * * * *